(12) United States Patent
Sheedy et al.

(10) Patent No.: US 11,816,638 B2
(45) Date of Patent: Nov. 14, 2023

(54) ELECTRONIC MAIL VERIFICATION

(71) Applicant: Bank of America Corporation, Charlotte, NC (US)

(72) Inventors: Jonathan Sheedy, Poynton (GB); Steven E. Sinks, Scottsdale, AZ (US); Brian P. Prange, Plano, TX (US); Matthew W. Findley, Saverna Park, MD (US); Jared D. Wilson, Charlotte, NC (US); Donald C. Hess, Charlotte, NC (US); Brian Devine, Austin, TX (US)

(73) Assignee: Bank of America Corporation, Charlotte, NC (US)

( * ) Notice: Subject to any disclaimer, the term of this patent is extended or adjusted under 35 U.S.C. 154(b) by 516 days.

(21) Appl. No.: 17/070,139

(22) Filed: Oct. 14, 2020

(65) Prior Publication Data
US 2022/0114553 A1    Apr. 14, 2022

(51) Int. Cl.
| | |
|---|---|
| *G06Q 10/107* | (2023.01) |
| *G06Q 30/018* | (2023.01) |
| *G06Q 40/02* | (2023.01) |
| *G06K 7/14* | (2006.01) |
| *H04L 9/40* | (2022.01) |
| *H04L 51/212* | (2022.01) |
| *G06F 40/205* | (2020.01) |

(52) U.S. Cl.
CPC ......... *G06Q 10/107* (2013.01); *G06K 7/1417* (2013.01); *G06Q 30/0185* (2013.01); *G06Q 40/02* (2013.01); *H04L 51/212* (2022.05); *H04L 63/123* (2013.01); *G06F 40/205* (2020.01)

(58) Field of Classification Search
None
See application file for complete search history.

(56) References Cited

U.S. PATENT DOCUMENTS

| | | |
|---|---|---|
| 7,290,035 B2 | 10/2007 | Mattathil |
| 7,660,861 B2 | 2/2010 | Taylor |
| 7,680,890 B1 * | 3/2010 | Lin ...................... G06Q 10/107 706/900 |
| 7,853,989 B2 | 12/2010 | Katsikas |

(Continued)

*Primary Examiner* — Kaveh Abrishamkar
(74) *Attorney, Agent, or Firm* — Banner & Witcoff, Ltd.

(57) ABSTRACT

Aspects of the disclosure relate to email verification. A computing platform may receive an electronic message and identify one or more portions of content in the message. Then, the computing platform may generate and embed one or more message-specific identifiers into the electronic message and store electronic message information associating the one or more portions of content with the one or more embedded message-specific identifiers. Thereafter, the computing platform may receive an electronic message verification request to verify authenticity of an identified electronic message received by a computing device. The computing platform may prompt a user of the computing device to provide authentication information associated with one or more portions of content of the identified electronic message. Based on comparing the authentication information provided by the user to the stored electronic message information, the computing platform may determine whether the identified electronic message is valid and send a notification accordingly.

17 Claims, 8 Drawing Sheets

(56) References Cited

U.S. PATENT DOCUMENTS

| | | | |
|---|---|---|---|
| 8,566,243 B1* | 10/2013 | Bharathula | G06Q 30/04 |
| | | | 705/40 |
| 8,752,172 B1* | 6/2014 | Dotan | H04L 63/1483 |
| | | | 709/206 |
| 10,284,597 B2* | 5/2019 | Shuster | H04L 63/1483 |
| 11,438,292 B1* | 9/2022 | Thangaraj | H04L 51/48 |
| 2004/0054887 A1 | 3/2004 | Paulsen et al. | |
| 2004/0181585 A1 | 9/2004 | Atkinson et al. | |
| 2004/0267893 A1* | 12/2004 | Lin | H04L 51/212 |
| | | | 709/207 |
| 2005/0102499 A1* | 5/2005 | Kosuga | G06F 21/64 |
| | | | 713/152 |
| 2005/0182735 A1* | 8/2005 | Zager | G06Q 20/3674 |
| | | | 705/67 |
| 2006/0053202 A1 | 3/2006 | Foo et al. | |
| 2006/0080533 A1 | 4/2006 | Bradbury | |
| 2006/0095528 A1 | 5/2006 | Sykes | |
| 2006/0149823 A1 | 7/2006 | Owen et al. | |
| 2006/0224677 A1 | 10/2006 | Ishikawa et al. | |
| 2007/0033208 A1* | 2/2007 | Talluri | G06F 16/958 |
| | | | 707/E17.112 |
| 2007/0053510 A1 | 3/2007 | Rosati et al. | |
| 2010/0198928 A1* | 8/2010 | Almeida | H04L 51/212 |
| | | | 709/206 |
| 2012/0066498 A1 | 3/2012 | Engert | |
| 2013/0081101 A1* | 3/2013 | Baer | G06F 21/577 |
| | | | 726/1 |
| 2013/0333030 A1 | 12/2013 | Farris | |
| 2014/0059672 A1* | 2/2014 | Natividad | G06F 21/46 |
| | | | 726/18 |
| 2014/0173695 A1* | 6/2014 | Valdivia | G06F 21/33 |
| | | | 726/4 |
| 2016/0057167 A1 | 2/2016 | Bach | |
| 2016/0350751 A1* | 12/2016 | Keys | G06Q 20/3829 |
| 2018/0152471 A1 | 5/2018 | Jakobsson | |
| 2019/0166128 A1 | 5/2019 | Kurian et al. | |
| 2019/0190721 A1* | 6/2019 | Machet | G06F 21/645 |
| 2019/0199745 A1 | 6/2019 | Jakobsson et al. | |
| 2020/0067861 A1 | 2/2020 | Leddy et al. | |
| 2020/0213332 A1 | 7/2020 | Thirumavalavan | |

* cited by examiner

ELECTRONIC MAIL VERIFICATION

BACKGROUND

Aspects of the disclosure relate to computer system security and identifying fraudulent electronic mail (email). In particular, one or more aspects of the disclosure relate to email verification.

Many organizations rely on email as an important communication tool. A growing concern for such organizations is the practice of "phishing," which involves tricking a user into visiting a fraudulent website that appears to be a legitimate website, and then soliciting personal information from the user. For example, the user may be fooled into giving away personal information which might then be used by the operators of the fraudulent website or others to steal the user's identity and/or make purchases under the user's name and account. Oftentimes, these phishing attempts may be accomplished through the use of email. In many instances, as phishing emails become more complex and look ever more legitimate, it may be harder for recipients to identify authentic emails from fraudulent ones.

SUMMARY

Aspects of the disclosure provide effective, efficient, scalable, and convenient technical solutions that address and overcome the technical problems associated with email verification. For example, some aspects of the disclosure provide ways for a user (e.g., a recipient of an email) to verify the legitimacy of (e.g., validate the origin of) an email in question, such as by entering information about the email into a web form (e.g., a code included in the email, an email address of the recipient, and/or other additional information about the email message), which would then yield details about what the email message should contain. Such details about what the email message should contain (e.g., who or what group sent the email, wording that the email should contain, a time the email was sent, a subject of the email, an email address of the originator, or the like) may then be used to match against the email in question (e.g., to validate contents of the received email). Additional aspects of the disclosure may relieve email recipients of the need to rely on an email provider to implement or adhere to technological standards since the techniques for email verification described herein may be agonistic with regard to the technology used to deliver and/or receive email content.

In accordance with one or more embodiments, a computing platform having at least one processor, a communication interface, and memory may receive, via the communication interface, an electronic message that includes one or more portions of content. The computing platform may identify the one or more portions of content in the electronic message. The computing platform may generate one or more message-specific identifiers that may uniquely identify the one or more portions of content in the electronic message. Subsequently, the computing platform may embed the one or more message-specific identifiers into the electronic message. The computing platform may store, in an electronic message database, electronic message information associating the one or more portions of content of the electronic message with the one or more message-specific identifiers embedded into the electronic message. Then, the computing platform may receive, via the communication interface, an electronic message verification request from at least one computing device to verify authenticity of an identified electronic message received by the at least one computing device. Next, the computing platform may prompt a user of the at least one computing device to provide authentication information. In addition, the authentication information may include information associated with one or more portions of content of the identified electronic message received by the at least one computing device. The computing platform may compare the authentication information provided by the user of the at least one computing device to the electronic message information stored in the electronic message database. Based on comparing the authentication information provided by the user of the at least one computing device to the electronic message information stored in the electronic message database, the computing platform may determine whether the identified electronic message is valid. Then, the computing platform may send, via the communication interface, to the at least one computing device, a notification indicating whether the identified electronic message is valid.

In some embodiments, the computing platform may cause the electronic message including the one or more message-specific identifiers to be sent, via the communication interface, to the at least one computing device.

In some embodiments, based on determining that the identified electronic message is not valid, the computing platform may send, via the communication interface, an alert to an enterprise computing device.

In some embodiments, based on determining that the identified electronic message is not valid, the computing platform may send, via the communication interface, a copy of the identified electronic message to an enterprise computing device.

In some embodiments, in response to receiving the electronic message verification request from the at least one computing device, the computing platform may send, via the communication interface, an authenticated image to the at least one computing device, where the authenticated image verifies authenticity of the identified electronic message received by the at least one computing device.

In some embodiments, prompting the user of the at least one computing device to provide authentication information may include prompting the user to input one or more of: an email address of a sender of the identified electronic message, a time the identified electronic message was sent, a date the identified electronic message was sent, a subject of the identified electronic message, or a portion of content at a specific location in the identified electronic message.

In some embodiments, prompting a user of the at least one computing device to provide authentication information may include prompting the user to enter the authentication information into a verification page on an online banking website to retrieve verification information.

In some embodiments, prompting a user of the at least one computing device to provide authentication information may include prompting the user to capture a unique graphical identifier in the identified electronic message.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
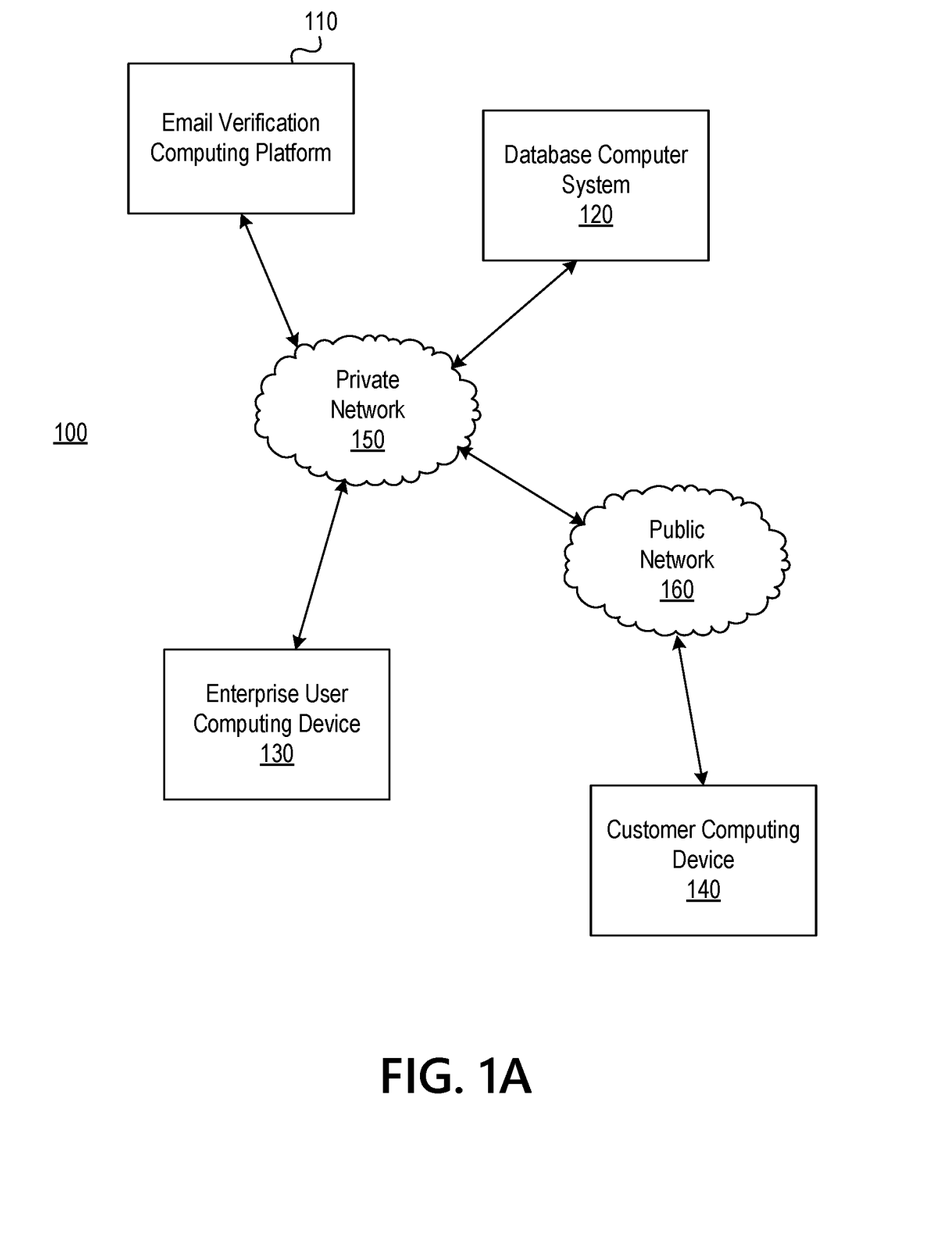
FIGS. 1A and 1B depict an illustrative computing environment for email verification in accordance with one or more example embodiments.
Figure 1B:
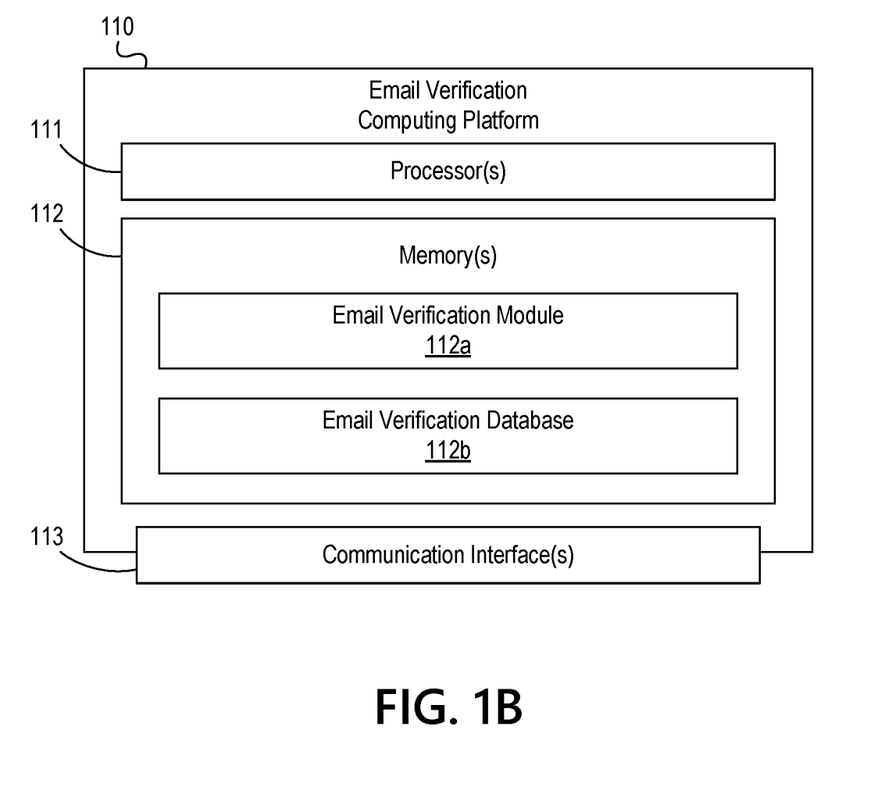

FIGS. 1A and 1B depict an illustrative computing environment for email verification in accordance with one or more example embodiments. Referring to FIG. 1A, computing environment 100 may include one or more computing devices and/or other computing systems. For example, computing environment 100 may include email verification computing platform 110, database computer system 120, enterprise user computing device 130, and customer computing device 140. Although one enterprise user computing device 130 is shown for illustrative purposes, any number of enterprise user computing devices may be used without departing from the disclosure. In addition, although one customer computing device 140 is shown for illustrative purposes, any number of customer computing devices may be used without departing from the disclosure.

As illustrated in greater detail below, email verification computing platform 110 may include one or more computing devices configured to perform one or more of the functions described herein. For example, email verification computing platform 110 may include one or more computers (e.g., laptop computers, desktop computers, servers, server blades, or the like).

Database computer system 120 may include different information storage entities storing electronic messages and/or information associated with the electronic messages. In some examples, database computer system 120 may store a collection of emails that have been previously sent (e.g., over a period of time). In some examples, database computer system 120 may store electronic message information associating one or more portions of content of an electronic message with one or more message-specific identifiers embedded into the electronic message.

Enterprise user computing device 130 may include one or more computing devices and/or other computer components (e.g., processors, memories, communication interfaces). For instance, enterprise user computing device 130 may be a server, desktop computer, laptop computer, tablet, mobile device, or the like, and may be associated with an enterprise organization operating email verification computing platform 110. Customer computing device 140 may include one or more computing devices and/or other computer components (e.g., processors, memories, communication interfaces). For instance, customer computing device 140 may be a server, desktop computer, laptop computer, tablet, mobile device, or the like, and may be used by a customer of an organization, such as a customer of a financial institution.

Computing environment 100 also may include one or more networks, which may interconnect one or more of email verification computing platform 110, database computer system 120, enterprise user computing device 130, and customer computing device 140. For example, computing environment 100 may include private network 150 and public network 160. Private network 150 and/or public network 160 may include one or more sub-networks (e.g., local area networks (LANs), wide area networks (WANs), or the like).

Private network 150 may be associated with a particular organization (e.g., a corporation, financial institution, educational institution, governmental institution, or the like) and may interconnect one or more computing devices associated with the organization. For example, email verification computing platform 110, database computer system 120, and enterprise user computing device 130 may be associated with an organization (e.g., a financial institution), and private network 150 may be associated with and/or operated by the organization, and may include one or more networks (e.g., LANs, WANs, virtual private networks (VPNs), or the like) that interconnect email verification computing platform 110, database computer system 120, and enterprise user computing device 130 and one or more other computing devices and/or computer systems that are used by, operated by, and/or otherwise associated with the organization.

Public network 160 may connect private network 150 and/or one or more computing devices connected thereto (e.g., email verification computing platform 110, database computer system 120, and enterprise user computing device 130) with one or more networks and/or computing devices that are not associated with the organization. For example, customer computing device 150 might not be associated with an organization that operates private network 150, and public network 160 may include one or more networks (e.g., the Internet) that connect customer computing device 150 to private network 150 and/or one or more computing devices connected thereto (e.g., email verification computing platform 110, database computer system 120, and enterprise user computing device 130).

In one or more arrangements, email verification computing platform 110, database computer system 120, enterprise user computing device 130, and customer computing device 140 may be any type of computing device capable of receiving a user interface, receiving input via the user interface, and communicating the received input to one or more other computing devices. For example, email verification computing platform 110, database computer system 120, enterprise user computing device 130, customer computing device 140, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, email verification computing platform 110 may include one or more processor(s) 111, memory(s) 112, and communication interface(s) 113. A data bus may interconnect processor 111, memory 112, and communication interface 113. Communication interface 113 may be a network interface configured to support communication between email verification computing platform 110 and one or more networks (e.g., private network 150, public network 160, or the like). Memory 112 may include one or more program modules having instructions that when executed by processor 111 cause email verification computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of email verification computing platform 110 and/or by different computing devices that may form and/or otherwise make up email verification computing platform 110. For example, memory 112 may have, store, and/or include an email verification module 112a and an email verification database 112b. Email verification module 112a may have instructions that direct and/or cause email verification computing platform 110 to, for instance, verify the authenticity of an email and determine how to respond, as discussed in greater detail below. Email verification database 112b may store information used by email verification module 112a and/or email verification computing platform 110 in verifying the authenticity of email and/or in performing other functions, as discussed in greater detail below.

Figure 2A:
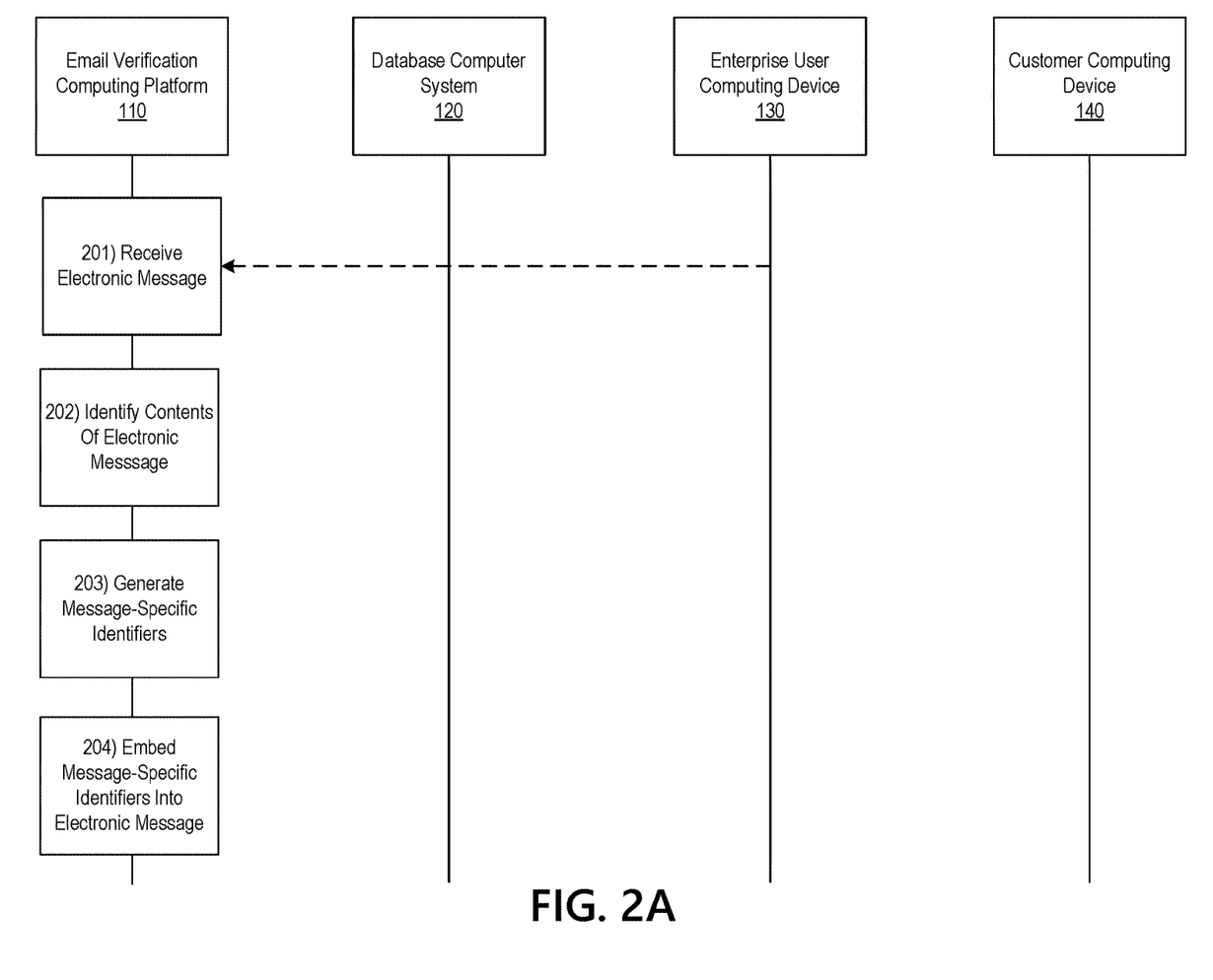
FIGS. 2A-2C depict an illustrative event sequence for email verification in accordance with one or more example embodiments.
Figure 2B:
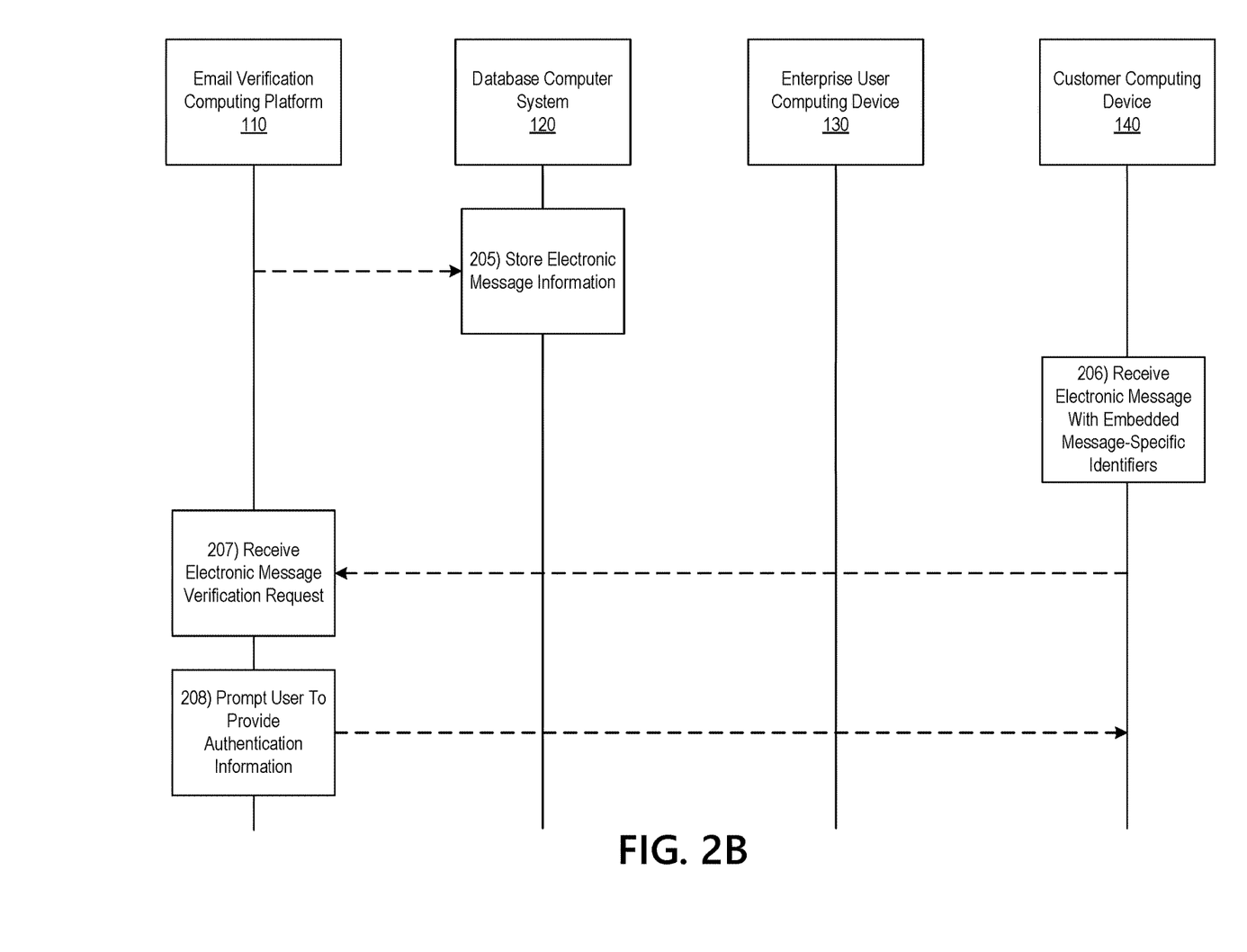
Figure 2C:
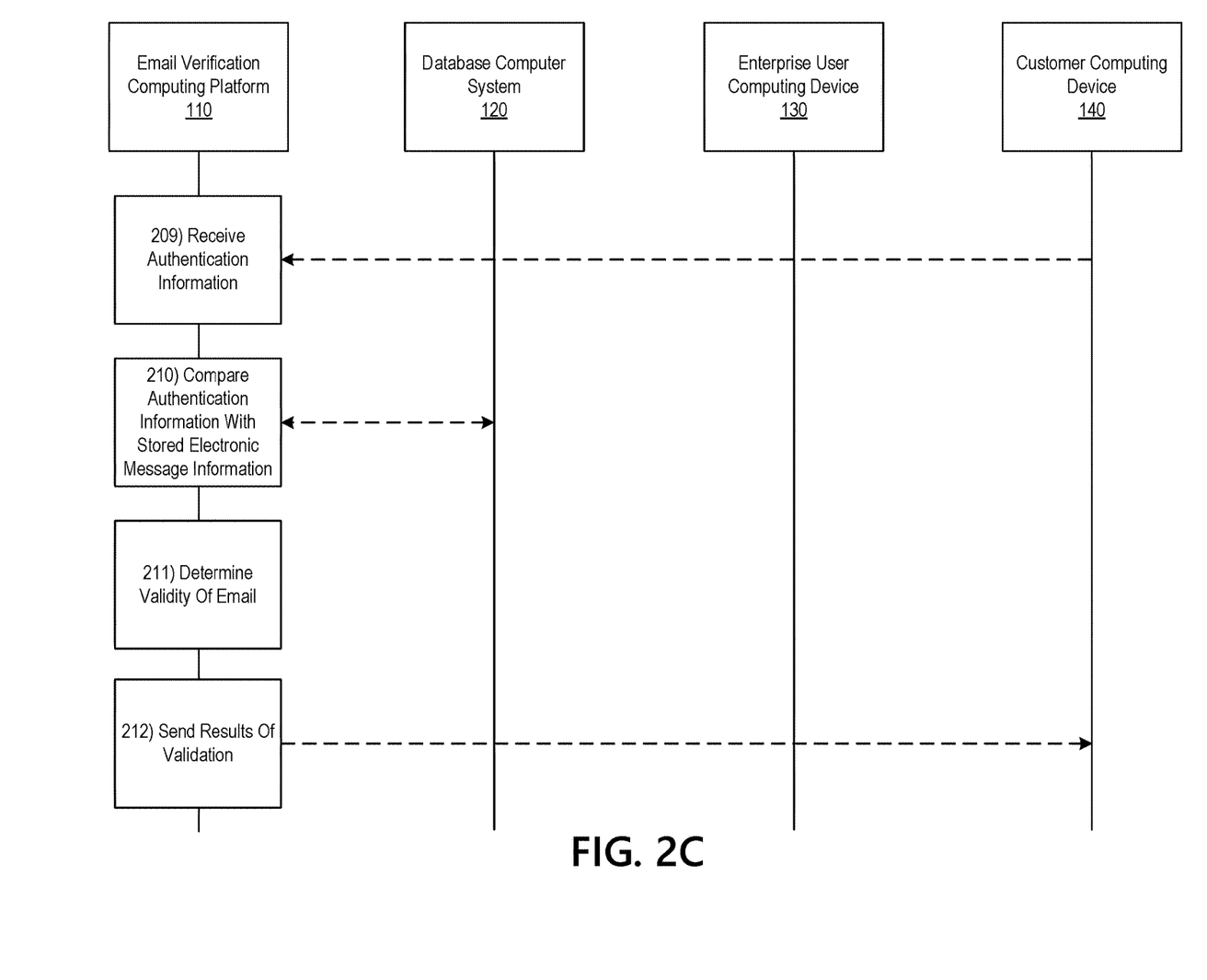

FIGS. 2A-2C depict an illustrative event sequence for email verification in accordance with one or more example embodiments. Referring to FIG. 2A, at step 201, email verification computing platform 110 may receive, via a communication interface (e.g., communication interface 113), an electronic message comprising one or more portions of content. For example, at step 201, email verification computing platform 110 may receive an electronic mail message from an enterprise user computing device 130, from which email messages may be composed by a user of the enterprise user computing device 130.

At step 202, email verification computing platform 110 may identify the one or more portions of content in the electronic message. For example, email verification computing platform 110 may parse or extract information from the received electronic message, such as information from a header field, a message subject, a message sender, a message group to/from header, and/or other information from the header fields of the email and/or from the body of the email. At step 203, email verification computing platform 110 may generate one or more message-specific identifiers (e.g., a unique symmetric key). Such message-specific identifiers may uniquely identify the one or more portions of content in the electronic message, including information from the header fields of the email and/or from the body of the email.

At step 204, email verification computing platform 110 may embed the one or more message-specific identifiers into the electronic message. For example, email verification computing platform 110 may embed the one or more message-specific identifiers into the electronic message by adding an element (e.g., code, an authentication token, a validation token, and/or the like) to the email that is sent with the email but might not be displayed to the user.

Referring to FIG. 2B, at step 205, email verification computing platform 110 may store, in an electronic message database, electronic message information associating the one or more portions of content of the electronic message with the one or more message-specific identifiers embedded into the electronic message. For example, email verification computing platform 110 may cause an electronic message database (e.g., database computer system 120) to store information associating the one or more portions of content of the electronic message with a one-time password or token included in the electronic message.

At step 206, in some embodiments, email verification computing platform 110 may cause the electronic message including the one or more message-specific identifiers to be sent, via the communication interface (e.g., communication interface 113), to at least one computing device (e.g., email server, email reception device, or the like). For example, email verification computing platform 110 may cause the electronic message including the one or more message-specific identifiers to be sent to a customer using a customer computing device 140. Additionally or alternatively, the electronic message including the one or more message-specific identifiers may be sent to non-clients or potential clients (e.g., users receiving marketing information associated with products and/or services offered by the originator of the email).

Figure 3:
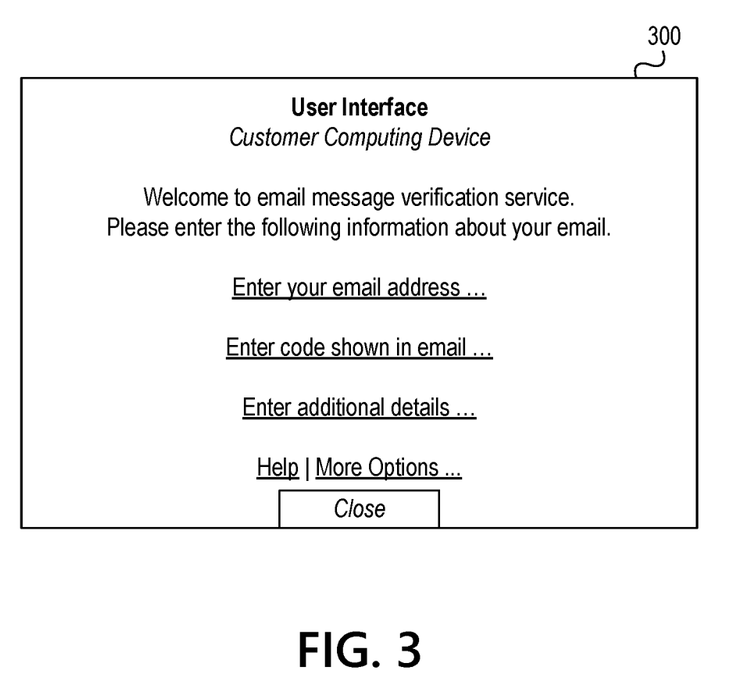
FIGS. 3-5 depict example graphical user interfaces for email verification in accordance with one or more example embodiments.

At step 207, email verification computing platform 110 may receive, via the communication interface (e.g., communication interface 113), an electronic message verification request from the at least one computing device (e.g., customer computing device 140) to verify authenticity of an identified electronic message received by the at least one computing device. In turn, at step 208, email verification computing platform 110 may prompt a user of the at least one computing device (e.g., customer computing device 140) to provide authentication information. In addition, the authentication information may include information associated with one or more portions of content of the identified electronic message received by the at least one computing device. For example, email verification computing platform 110 may cause the at least one computing device (e.g., customer computing device 140) to display and/or otherwise present one or more graphical user interfaces similar to graphical user interface 300, which is illustrated in FIG. 3. As seen in FIG. 3, graphical user interface 300 may include text and/or other information prompting the user of the at least one computing device (e.g., customer computing device 140) to provide authentication information associated with one or more portions of content of an identified electronic message received by the at least one computing device (e.g., "Welcome to email message verification service. Please enter the following information about your email. [Enter your email address] [Enter code shown in email] [Enter additional details].")

In some examples, prompting a user of the at least one computing device to provide authentication information may include prompting the user to enter the authentication information into a verification page on an online banking website to retrieve verification information. In some examples, prompting the user of the at least one computing device to provide authentication information may include prompting the user of the at least one computing device (e.g., customer computing device 140) to input one or more of: an email address of a sender of the identified electronic message, a time the identified electronic message was sent, a date the identified electronic message was sent, a subject of the identified electronic message, or a portion of content at a specific location in the identified electronic message. For instance, the user of the at least one computing device (e.g., customer computing device 140) may be prompted to identify or enter words that are at specific points within the body of the email. In some examples, prompting a user of the at least one computing device (e.g., customer computing device 140) to provide authentication information may include prompting the user to capture a unique graphical identifier in the identified electronic message. For instance, the user of the at least one computing device (e.g., customer computing device 140) might be presented with a QR code or other graphical code on the computing device and may be prompted to use an application (e.g., a mobile phone camera or scanner) to capture the code, which may then be sent to email verification computing platform 110 for verification.

In some embodiments, in response to receiving the electronic message verification request from the at least one computing device at step 207, the computing platform may provide the user with additional checks. For example, the computing platform may send, via the communication interface (e.g., communication interface 113), an authenticated image or logo to the at least one computing device (e.g., customer computing device 140) that may assist in verifying authenticity of the identified electronic message received by the at least one computing device (e.g., by matching against the user's received email).

Referring to FIG. 2C, at step 209, email verification computing platform 110 may receive the authentication information from the at least one computing device (e.g., provided at user interface 300). In turn, at step 210, email verification computing platform 110 may compare the authentication information provided by the user of the at least one computing device (e.g., customer computing device 140) to the electronic message information stored in the electronic message database (e.g., database computer system 120). For example, email verification computing platform 110 may execute the comparison by performing a search through all of the stored emails in database computer system 120 that pertain to a specific recipient, a specific period, or that include a specific code. At step 211, based on comparing the authentication information provided by the user of the at least one computing device (e.g., customer computing device 140) to the electronic message information stored in the electronic message database (e.g., database computer system 120), the computing platform may determine whether the identified electronic message is valid (e.g., whether database computer system 120 has a record or no record of the email in question).

Figure 4:
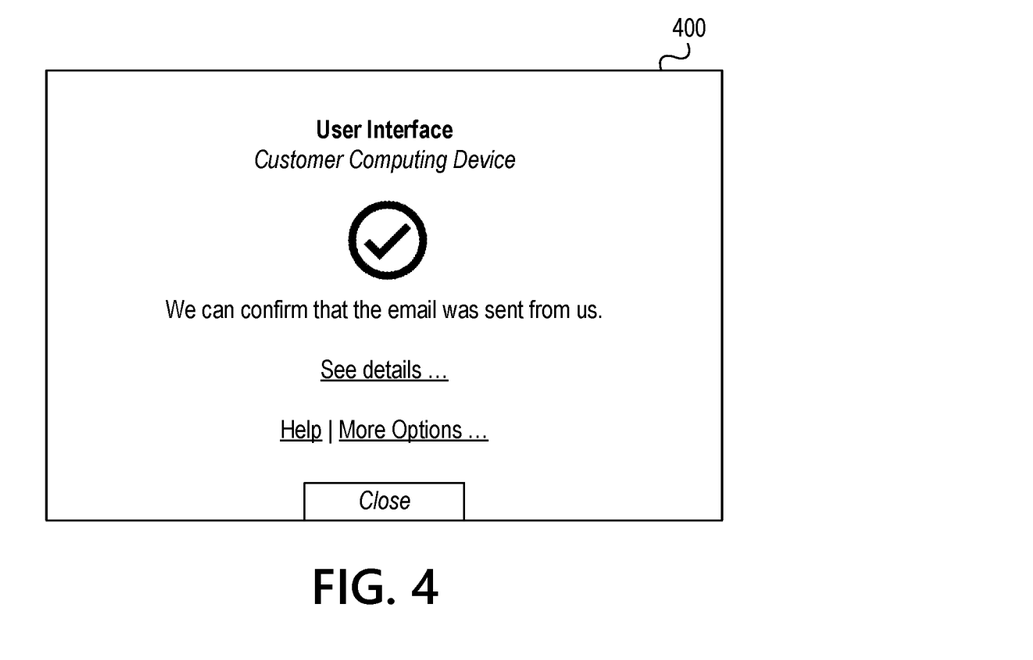
Figure 5:
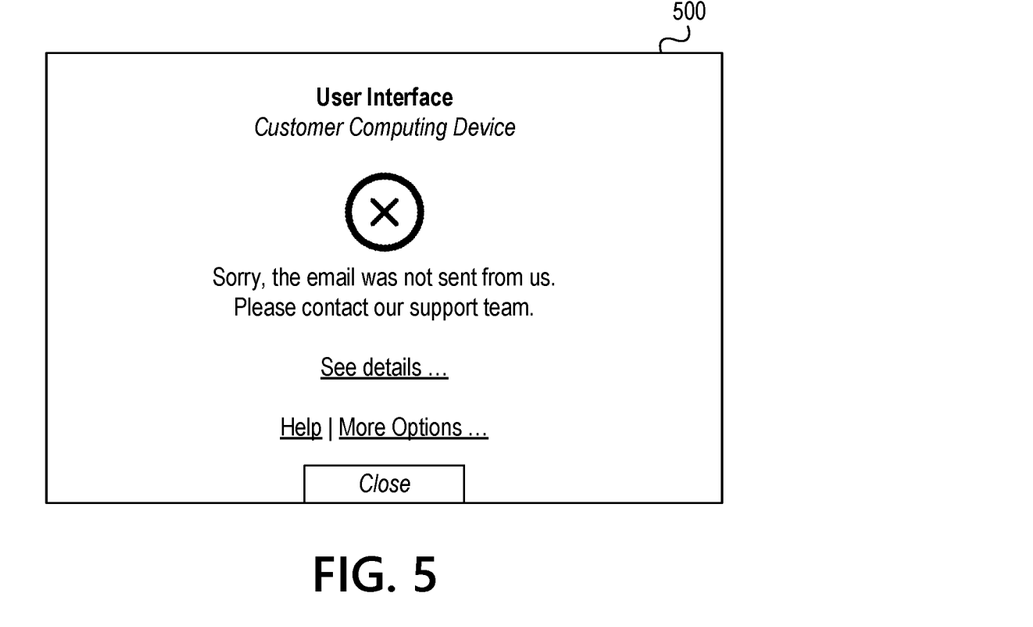

At step 212, email verification computing platform 110 may send, via the communication interface (e.g., communication interface 113), to the at least one computing device, a notification indicating whether the identified electronic message is valid. For example, in sending the notification (e.g., at step 212), email verification computing platform 110 may cause the at least one computing device (e.g., customer computing device 140) to display and/or otherwise present one or more graphical user interfaces similar to graphical user interfaces 400 and 500, which are illustrated in FIGS. 4 and 5, respectively. As seen in FIGS. 4 and 5, graphical user interfaces 400 and 500 may include text and/or other information indicating whether the identified electronic message is valid. As seen in FIG. 4, graphical user interface 400 may include text and/or other information indicating that the identified electronic message is valid (e.g., "We can confirm that the email was sent from us. [See details]"). As seen in FIG. 5, graphical user interface 500 may include text and/or other information indicating that the identified electronic message is valid ("Sorry, the email was not sent from us. Please contact our support team. [See details]"). In this regard, graphical user interfaces 400 and 500 may provide details such as who or what group sent the email, wording that the email should contain, a time the email was sent, a subject of the email, an email address of the originator, or the like, such that the user may validate the details against a received email message. It will be appreciated that other and/or different notifications may also be provided.

In some examples, based on determining that the identified electronic message is not valid, email verification computing platform 110 may send, via the communication interface (e.g., communication interface 113), an alert to an enterprise computing device (e.g., enterprise computing device 130). For instance, email verification computing platform 110 may forward the email to an abuse mailbox at enterprise computing device 130 or other computing device for review, remediation, or other resolution. In other examples, based on determining that the identified electronic message is not valid, email verification computing platform 110 may send, via the communication interface (e.g., communication interface 113), a copy of the identified electronic message to an enterprise computing device. For instance, email verification computing platform 110 may instantly upload the email content, thereby providing instant reporting of a suspicious or malicious email without relying on the user device to forward the email separately.

Figure 6:
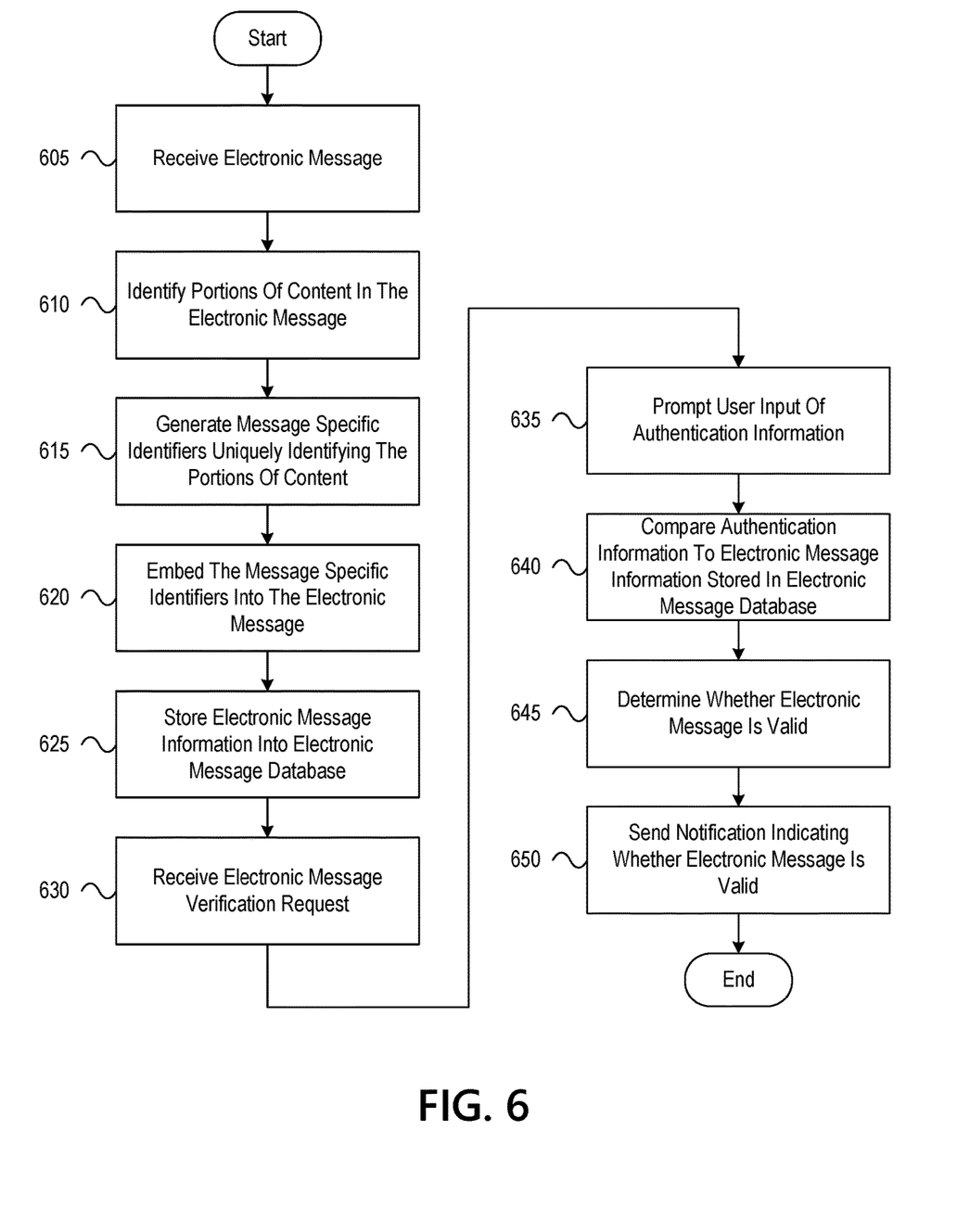
FIG. 6 depicts an illustrative method for email verification in accordance with one or more example embodiments.

FIG. 6 depicts an illustrative method for email verification in accordance with one or more example embodiments. Referring to FIG. 6, at step 605, a computing platform having at least one processor, a communication interface, and memory may receive, via the communication interface, an electronic message that includes one or more portions of content. At step 610, the computing platform may identify the one or more portions of content in the electronic message. At step 615, the computing platform may generate one or more message-specific identifiers that may uniquely identify the one or more portions of content in the electronic message. At step 620, the computing platform may embed the one or more message-specific identifiers into the electronic message. At step 625, the computing platform may store, in an electronic message database, electronic message information associating the one or more portions of content of the electronic message with the one or more message-specific identifiers embedded into the electronic message. At step 630, the computing platform may receive, via the communication interface, an electronic message verification request from at least one computing device to verify authenticity of an identified electronic message received by the at least one computing device. At step 635, the computing platform may prompt a user of the at least one computing device to provide authentication information. In addition, the authentication information may include information associated with one or more portions of content of the identified electronic message received by the at least one computing device. At step 640, the computing platform may compare the authentication information provided by the user of the at least one computing device to the electronic message information stored in the electronic message database. At step 645, based on comparing the authentication information provided by the user of the at least one computing device to the electronic message information stored in the electronic message database, the computing platform may determine whether the identified electronic message is valid. At step 650, the computing platform may send, via the communication interface, to the at least one computing device, a notification indicating whether the identified electronic message is valid.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, an electronic message comprising one or more portions of content;
   identify the one or more portions of content in the electronic message;
   generate one or more message-specific identifiers that uniquely identify the one or more portions of content in the electronic message;
   embed the one or more message-specific identifiers into the electronic message;
   store, in an electronic message database, electronic message information associating the one or more portions of content of the electronic message with the one or more message-specific identifiers embedded into the electronic message;
   receive, via the communication interface, an electronic message verification request from at least one computing device to verify authenticity of an identified electronic message received by the at least one computing device;
   prompt a user of the at least one computing device to input authentication information into a verification page on an online banking website to verify the authenticity of the identified electronic message received by the at least one computing device, wherein the authentication information includes information associated with one or more portions of content of the identified electronic message received by the at least one computing device, including a portion of content at a specific location in the identified electronic message received by the at least one computing device;
   compare the authentication information input by the user of the at least one computing device to the electronic message information stored in the electronic message database;
   based on comparing the authentication information input by the user of the at least one computing device to the electronic message information stored in the electronic message database, determine whether the identified electronic message is valid; and
   send, via the communication interface, to the at least one computing device, a notification indicating whether the identified electronic message is valid.

2. The computing platform of claim 1, wherein the memory stores additional computer-readable instructions that, when executed by the at least one processor, cause the computing platform to:
   cause the electronic message comprising the one or more message-specific identifiers to be sent, via the communication interface, to the at least one computing device.

3. The computing platform of claim 1, wherein the memory stores additional computer-readable instructions that, when executed by the at least one processor, cause the computing platform to:
   based on determining that the identified electronic message is not valid, send, via the communication interface, an alert to an enterprise computing device.

4. The computing platform of claim 1, wherein the memory stores additional computer-readable instructions that, when executed by the at least one processor, cause the computing platform to:

based on determining that the identified electronic message is not valid, send, via the communication interface, a copy of the identified electronic message to an enterprise computing device.

5. The computing platform of claim 1, wherein the memory stores additional computer-readable instructions that, when executed by the at least one processor, cause the computing platform to:
in response to receiving the electronic message verification request from the at least one computing device, send, via the communication interface, an authenticated image to the at least one computing device that verifies authenticity of the identified electronic message received by the at least one computing device.

6. The computing platform of claim 1, wherein prompting the user of the at least one computing device to input authentication information further comprises prompting the user to input one or more of: an email address of a sender of the identified electronic message, a time the identified electronic message was sent, a date the identified electronic message was sent, or a subject of the identified electronic message.

7. The computing platform of claim 1, wherein prompting a user of the at least one computing device to input authentication information comprises prompting the user to capture a unique graphical identifier in the identified electronic message.

8. A method, comprising:
at a computing platform comprising at least one processor, a communication interface, and memory:
receiving, by the at least one processor, via the communication interface, an electronic message comprising one or more portions of content;
identifying, by the at least one processor, the one or more portions of content in the electronic message;
generating, by the at least one processor, one or more message-specific identifiers that uniquely identify the one or more portions of content in the electronic message;
embedding, by the at least one processor, the one or more message-specific identifiers into the electronic message;
storing, by the at least one processor, in an electronic message database, electronic message information associating the one or more portions of content of the electronic message with the one or more message-specific identifiers embedded into the electronic message;
receiving, by the at least one processor, via the communication interface, an electronic message verification request from at least one computing device to verify authenticity of an identified electronic message received by the at least one computing device;
prompting, by the at least one processor, a user of the at least one computing device to input authentication information into a verification page on an online banking website to verify the authenticity of the identified electronic message received by the at least one computing device, wherein the authentication information includes information associated with one or more portions of content of the identified electronic message received by the at least one computing device, including a portion of content at a specific location in the identified electronic message received by the at least one computing device;
comparing, by the at least one processor, the authentication information input by the user of the at least one computing device to the electronic message information stored in the electronic message database;
based on comparing the authentication information input by the user of the at least one computing device to the electronic message information stored in the electronic message database, identifying, by the at least one processor, whether the identified electronic message is valid; and
sending, by the at least one processor, via the communication interface, to the at least one computing device, a notification indicating whether the identified electronic message is valid.

9. The method of claim 8, further comprising:
causing the electronic message comprising the one or more message-specific identifiers to be sent, via the communication interface, to the at least one computing device.

10. The method of claim 8, further comprising:
based on determining that the identified electronic message is not valid, sending, by the at least one processor, via the communication interface, an alert to an enterprise computing device.

11. The method of claim 8, further comprising:
based on determining that the identified electronic message is not valid, sending, by the at least one processor, via the communication interface, a copy of the identified electronic message to an enterprise computing device.

12. The method of claim 8, further comprising:
in response to receiving the electronic message verification request from the at least one computing device, sending, by the at least one processor, via the communication interface, an authenticated image to the at least one computing device that verifies authenticity of the identified electronic message received by the at least one computing device.

13. The method of claim 8, wherein prompting the user of the at least one computing device to input authentication information further comprises prompting the user to input one or more of: an email address of a sender of the identified electronic message, a time the identified electronic message was sent, a date the identified electronic message was sent, or a subject of the identified electronic message.

14. The method of claim 8, wherein prompting a user of the at least one computing device to input authentication information comprises prompting the user to capture a unique graphical identifier in the identified electronic message.

15. One or more non-transitory computer-readable media storing instructions that, when executed by a computing platform comprising at least one processor, a communication interface, and memory, cause the computing platform to:
receive, via the communication interface, an electronic message comprising one or more portions of content;
identify the one or more portions of content in the electronic message;
generate one or more message-specific identifiers that uniquely identify the one or more portions of content in the electronic message;
embed the one or more message-specific identifiers into the electronic message;
store, in an electronic message database, electronic message information associating the one or more portions of content of the electronic message with the one or more message-specific identifiers embedded into the electronic message;

receive, via the communication interface, an electronic message verification request from at least one computing device to verify authenticity of an identified electronic message received by the at least one computing device;

prompt a user of the at least one computing device to input authentication information into a verification page on an online banking website to verify the authenticity of the identified electronic message received by the at least one computing device, wherein the authentication information includes information associated with one or more portions of content of the identified electronic message received by the at least one computing device, including a portion of content at a specific location in the identified electronic message received by the at least one computing device;

compare the authentication information input by the user of the at least one computing device to the electronic message information stored in the electronic message database;

based on comparing the authentication information input by the user of the at least one computing device to the electronic message information stored in the electronic message database, determine whether the identified electronic message is valid; and send, via the communication interface, to the at least one computing device, a notification indicating whether the identified electronic message is valid.

16. The one or more non-transitory computer-readable media of claim 15, wherein the instructions are configured to, when executed, further cause the computing platform to:

based on determining that the electronic message is not valid, send, via the communication interface, a copy of the identified electronic message to an enterprise computing device.

17. The one or more non-transitory computer-readable media of claim 15, wherein prompting the user of the at least one computing device to input authentication information further comprises prompting the user to input one or more of: an email address of a sender of the identified electronic message, a time the identified electronic message was sent, a date the identified electronic message was sent, or a subject of the identified electronic message.

* * * * *